United States Patent
Hashimoto (10) Patent No.: US 7,885,241 B2
(45) Date of Patent: Feb. 8, 2011

(54) RECEIVING APPARATUS

(75) Inventor: Takanori Hashimoto, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 711 days.

(21) Appl. No.: 11/938,915

(22) Filed: Nov. 13, 2007

(65) Prior Publication Data

US 2008/0253338 A1 Oct. 16, 2008

(30) Foreign Application Priority Data

Nov. 22, 2006 (JP) ............................... 2006-315460
Feb. 9, 2007 (JP) ............................... 2007-030108

(51) Int. Cl.
*H04J 3/00* (2006.01)

(52) U.S. Cl. ...................... 370/337; 370/347

(58) Field of Classification Search ................ 370/337, 370/347, 321, 345, 349, 401, 471, 389, 328, 370/280, 294, 350, 341, 338, 334, 331, 324, 370/326; 375/365, 366, 368

See application file for complete search history.

(56) References Cited

U.S. PATENT DOCUMENTS 7,773,568 B2 * 8/2010 Yamasaki et al. ........... 370/337

FOREIGN PATENT DOCUMENTS

| JP | 1139601 | * | 3/2001 |
|----|---------|---|--------|
| JP | 2003-204310 | | 7/2003 |
| JP | 3793724 | | 7/2003 |

* cited by examiner

*Primary Examiner*—Chi H Pham
*Assistant Examiner*—Alexander Boakye
(74) *Attorney, Agent, or Firm*—Studebaker & Brackett PC; Donald R. Studebaker

(57) ABSTRACT

LCCH steal receiving is done by a receiving unit which uses TDMA method without overloading to the control processor. A UW detecting unit 10 for detecting a UW by setting a UW expected value for control channel according to a timing signal TM3 from a LCCH timing unit 30, a frame timing unit 20 for outputting a frame timing signal TM1 of the frame according to a UW detecting signal DET, the LCCH timing unit 30 for outputting a timing signal TM3 for the UW detecting unit 10 and a timing signal TM5 for a PLL control unit 40 by counting the timing signal TM1, and the PLL control unit 40 for selecting and outputting a channel setting signal CH for a PLL2 according to the timing signal TM5 are all configured by hardware circuits. By the above configuration, the LCCH steal receiving becomes possible without software operations of the receiving units.

4 Claims, 5 Drawing Sheets

A RECEIVING APPARATUS ACCORDING TO THE FIRST EMBODIMENT OF THE PRESENT INVENTION

Fig. 5

A LCCH TIMING UNIT ACCORDING TO THE THIRD EMBODIMENT OF THE PRESENT INVENTION

RECEIVING APPARATUS

BACKGROUND OF THE INVENTION

1. Field of the Invention

The present invention relates to a receiving apparatus for radio communication system using TDMA (Time Division Multiple Access) method, especially, a control for receiving a control channel at a specific period during a packet data communication.

This is a counterpart of Japanese patent application Serial Number 030108/2007, filed on Feb. 9, 2007, the subject matter of which is incorporated herein by reference.

2. Description of the Related Art

In the simplified mobile phone system referred to as "PHS (Personal Handyphone System), sending and receiving the packet data having one frame of 5 ms by TDMA method using the service channel (communication channel) designated at every linkup between the base and mobile stations. In addition, from the base station, the annunciation signal of radio channel information (hereinafter referred to as only "annunciation signal") is sent at the interval of the N (for example, N=20) frame period (hereinafter referred to as "LCCH period") using the dedicated logic control channel (hereinafter referred to as "LCCH").

In the following patent document 1, the receiving circuit being able to receive the annunciation signal by LCCH during the packet communication (hereinafter referred to as "LCCH steal receiving") is disclosed.

Figure 2:
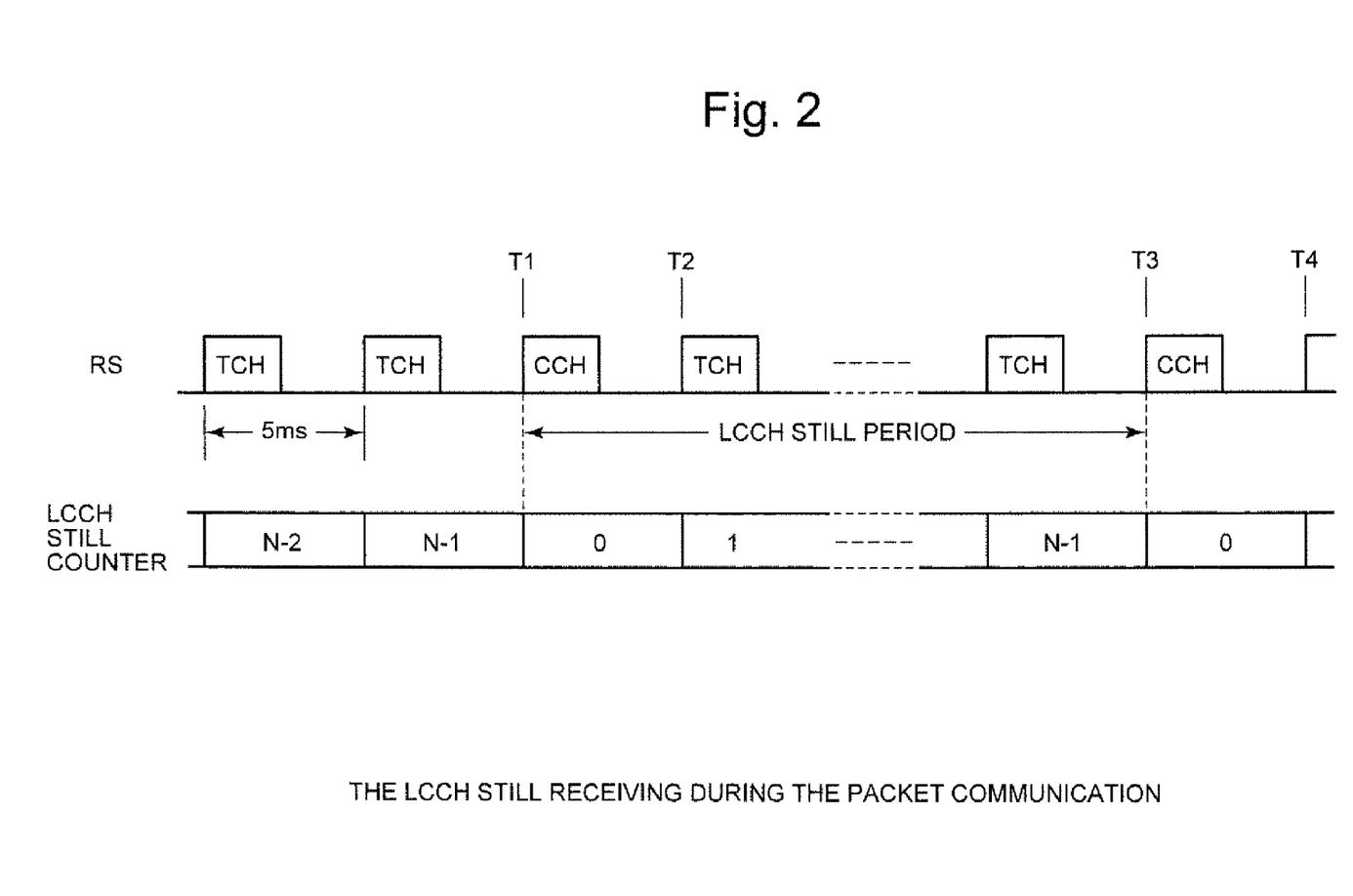
FIG. 2: A timing chart of setting the LCCH steal receiving during the packet communication of the conventional receiving apparatus.

FIG. 2 is a view of timing diagram of setting the LCCH steal receiving during the packet communication in the conventional receiving circuit described in the patent document 1.

As shown in FIG. 2, in the case where the LCCH receiving is done during the packet data receiving, it is necessary to switch the frequency from the service channel to the LCCH and to switch the expected value of the synchronous pattern referred to as "unique word" (hereinafter referred to as "UW"). Therefore, in order to receive the annunciation information CCH at the interval of the LCCH period during receiving the packet data TCH at 5 ms interval, the LCCH steal counter is installed and counted by the software.

When the value of the LCCH steal counter becomes N−1, the receiving frequency and the UW expected value are switched to ones corresponding to the LCCH in order to receive the LCCH from the following frame. Subsequently, when the UW of the LCCH is detected at the frame starting from the time T1 of FIG. 2, the value of the LCCH steal counter is cleared to zero.

In order to receive the service channel after the following 5 ms, the receiving frequency and the UW expected value are switched to ones corresponding to the service channel Subsequently, when the UW of service channel at the following frame starting from the time T2 is detected, the counter value of the LCCH steal counter is incremented to one. After the above operation, the value of the LCCH steal counter is incremented one by one every time the UW of the service channel is detected.

Subsequently, when the value of the LCCH steal counter becomes N−1, in order to receive the LCCH at the frame starting from the time T3 again, the receiving frequency and the UW expected value are switched to ones corresponding to the LCCH. There is a description that communication data can be received by the above-mentioned operations, using the period while the annunciation signal is received by the LCCH.

Patent document 1: Japanese Patent Number 3793724.

SUMMARY OF THE INVENTION

Problem to be Solved:

However, there is a problem that since setting the receiving frequency and the UW expected value and clearing the LCCH counter to zero are done by the software in the receiving circuit described in the above patent document 1, the control processor becomes loaded too much to process the primary sending and receiving control process without any influence.

The object of the present invention is providing a receiving apparatus of TDMA method having capability of LCCH steal receiving without overload on a control processor.

Solution:

According to the present invention, a mobile-station receiving-apparatus for radio communication by TDMA method between base stations using control and communication channels is characterized by including a demodulating unit, an UW detecting unit, a frame-timing unit, a control channel timing unit, a selector and a channel control unit.

The demodulating unit receives and demodulates a signal sent from a base station correspondingly to a channel setting signal, and outputs the demodulated receiving signal. The UW detecting unit switches synchronous patterns for control and communication correspondingly to a first selecting signal and outputs a detecting signal when the same pattern as the switched pattern appears in the above receiving data. The frame-timing unit outputs first and second timing-signals in a specific frame-period synchronized with the above detecting signal. The control channel timing unit includes a counter for counting the above timing-signals, a zero detecting circuit for outputting the above first selecting signal corresponding to whether the above counter value is zero or not, a comparing circuit for clearing the above counter to zero when the above counter value becomes more than the set value in a register, and a matching detection circuit for outputting a second selection signal when the above counter value matches to the set value in the above register. The selector selects the above control channel or the above communication channel based on the above second selecting signal. The channel control unit holds the channel selected by the above selector using the above second timing signal and provides the above demodulating unit with the above held channel as a channel setting signal.

Effect of the Present Invention:

The present invention includes hardware circuits of the UW detecting unit for setting the UW expected value at every LCCH period of TDMA, the control channel timing unit for clearing the LCCH steal counter to zero, and the channel control unit for setting the receiving frequency. By the above configuration, the above operations does not need to be processed by the software, and then there is an effect that LCCH steal receiving can be done without overload on the control processor.

DETAILED DESCRIPTION OF THE PREFERRED EMBODIMENTS

The above mentioned and other objectives of the present invention, and the novelty of the present invention will become clear more thoroughly by reading the following description of the preferred embodiment referring to the drawings. However, the drawings are only for the explanation, and do not limit the scope of the present invention.

First Embodiment

Figure 1:
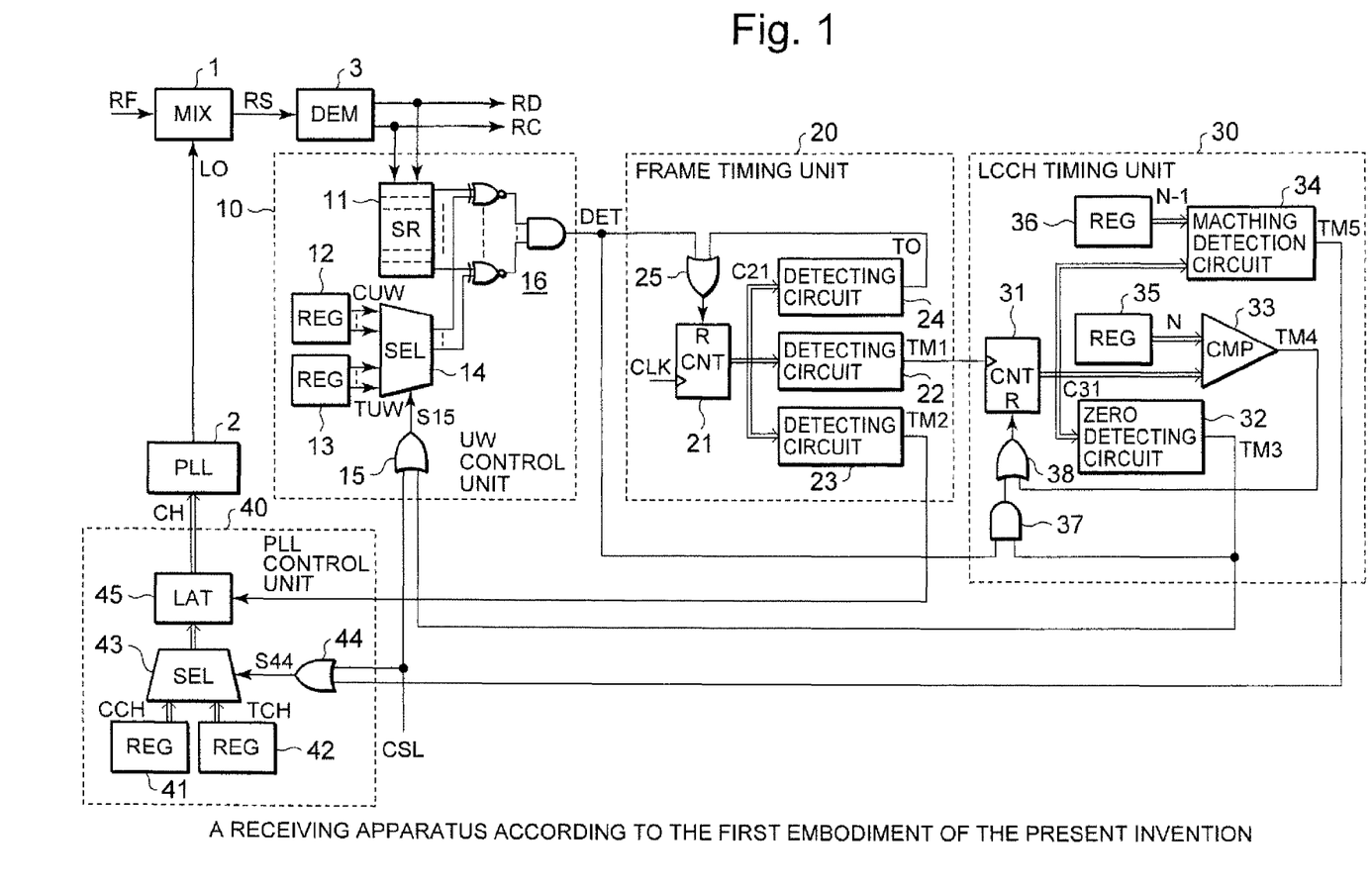
FIG. 1: A general configuration diagram of a receiving apparatus according to the first embodiment of the present invention.

FIG. 1 is a general configuration diagram of a receiving apparatus according to the first embodiment of the invention, and shows a part of a mobile-station receiving-unit of PHS.

The above receiving apparatus includes a frequency transforming unit (MIX) 1 for transforming a radio signal RF received by an antenna not shown in the drawings to a receiving signal RS. The frequency-transforming unit 1 outputs the receiving signal RS for the required channel by mixing the radio signal RF and a local oscillation signal generated by local oscillation circuit such as a PLL (Phase Locked Loop) 2, etc. The receiving signal RS is given to the demodulating unit (DEM) 3 and the receiving data RD and the receiving clock RC are demodulated. The above receiving data RD and the receiving clock RC are given to a communication control unit not shown in the drawings.

Furthermore, the above receiving apparatus includes a UW detecting unit 10, a frame-timing unit 20, a LCCH timing unit 30, and a PLL control unit 40.

The UW detecting unit 10 detects a synchronous pattern in the packet data according to the receiving data RD and the receiving clock RC, and includes a shift register 11 for sequentially shifting and holding the receiving data RD according to the receiving clock RC, and for outputting the above receiving data RD in parallel. In addition, the above UW detecting unit 10 includes a register 12 for setting a unique word CUW for the LCCH, and a register 13 for setting a unique word TUW for the service channel. The registers 12, 13 are connected to a selector (SEL) 14, and one of the above registers is selected by a UW selecting signal S15 provided by an OR gate (herein after referred to as "OR") 15. The OR 15 outputs an OR operation result between a LCCH designating signal CSL for selecting forcibly the LCCH and a after-mentioned timing signal TM3 from the LCCH timing unit 30 as a UW selecting signal S15.

An output signal from the selector 14 is given to a matching detection circuit 16 with a parallel output signal from the sift register 11. The matching detection circuit 16 is consists of a plural of exclusive NOR gates (hereinafter referred to as "ENOR") for comparing the output signals from the registers 11,14 with respect to each of the corresponding bits, and a AND gate (hereinafter referred to as "AND") for doing AND operation between the outputs from the above ENOR gates. In the above configuration, when the receiving data RD held in the shift register 11 matches to the UW selected by the selector 14 according to the UW selecting signal S15, the UW detecting signal DET is outputted from the AND.

The frame timing unit 20 generates a timing signal for within one frame of 5 ms based on the UW detecting signal DET, and includes a counter (CNT) 21 for counting the clock signal CLK. A counting value C21 of a counter 21 is given to detecting circuits 22, 23, 24.

The detecting circuit 22 outputs a timing signal TM1 for frame counting of the LCCH timing unit 30 according to the counting value C21. The detecting circuit 23 outputs a timing signal TM2 for the PLL control unit 40 according to the counting C21. The detecting circuit 24 outputs a timeout signal TO when the counting value reaches to the value corresponding to 5 ms.

The timeout signal TO is given to an OR 25 with the UW detecting signal DET from the UW detecting unit 10, and an output signal from the above OR 25 is given to a reset terminal R of the counter 21.

The LCCH timing unit 30 counts the timing signal TM1 given from the frame-timing unit 20, to generate various timing signals for within the LCCH period based on the above counting value, and includes a counter 31 for counting the above timing signal TM1. A counting value C31 of the counter 31 is given to a zero detecting circuit 32, a comparing circuit (CMP) 33, and a matching detection circuit 34.

A zero detecting circuit 32 outputs a timing signal TM3 when the counting value C31 is zero. A comparing circuit 33 outputs a timing signal TM4 when the counting value C31 is more than a value N set in a register 35 (i.e. the number of frames during one LCCH period). A matching detection circuit 34 outputs a timing signal TM5 when the counting value C31 matches to a value N−1 set in a register 36.

The timing signal TM3 is given to an AND 37 with the UW detecting signal DET from the UW detecting unit 10. The output signal from the AND 37 is given to an OR 38 with the timing signal TM4, and the output signal of the above OR 38 is provided a reset terminal R of the counter 31.

The PLL control unit 40 outputs a channel setting signal CH for the PLL 2, and includes a register 41 for setting a channel setting signal CCH correspondingly to the LCCH, and a register 42 for setting a channel setting signal TCH correspondingly to the service channel. The registers 41, 42 are connected to a selector 43, and one of the above registers is selected by a channel-selecting signal S44 from an OR 44. The OR 44 outputs a result of OR operation between a LCCH designating signal CSL and the timing signals TM5 from the LCCH timing unit 30 as a channel selecting signal S44.

A Latch (LAT) 45 is connected to the output side of the selector 43. The latch 45 holds an output signal from the selector 43 according to the timing signal TM2 given by the frame-timing unit 20, and provides the PLL 2 with the above held signal.

Furthermore, the registers 12, 13, 35, 36 initially set correspondingly to an applied system by a communication control unit not shown in the drawings. At the same time, the registers 41, 42 are set correspondingly to the channel allocation state by the communication control unit, as needed.

Figure 3:
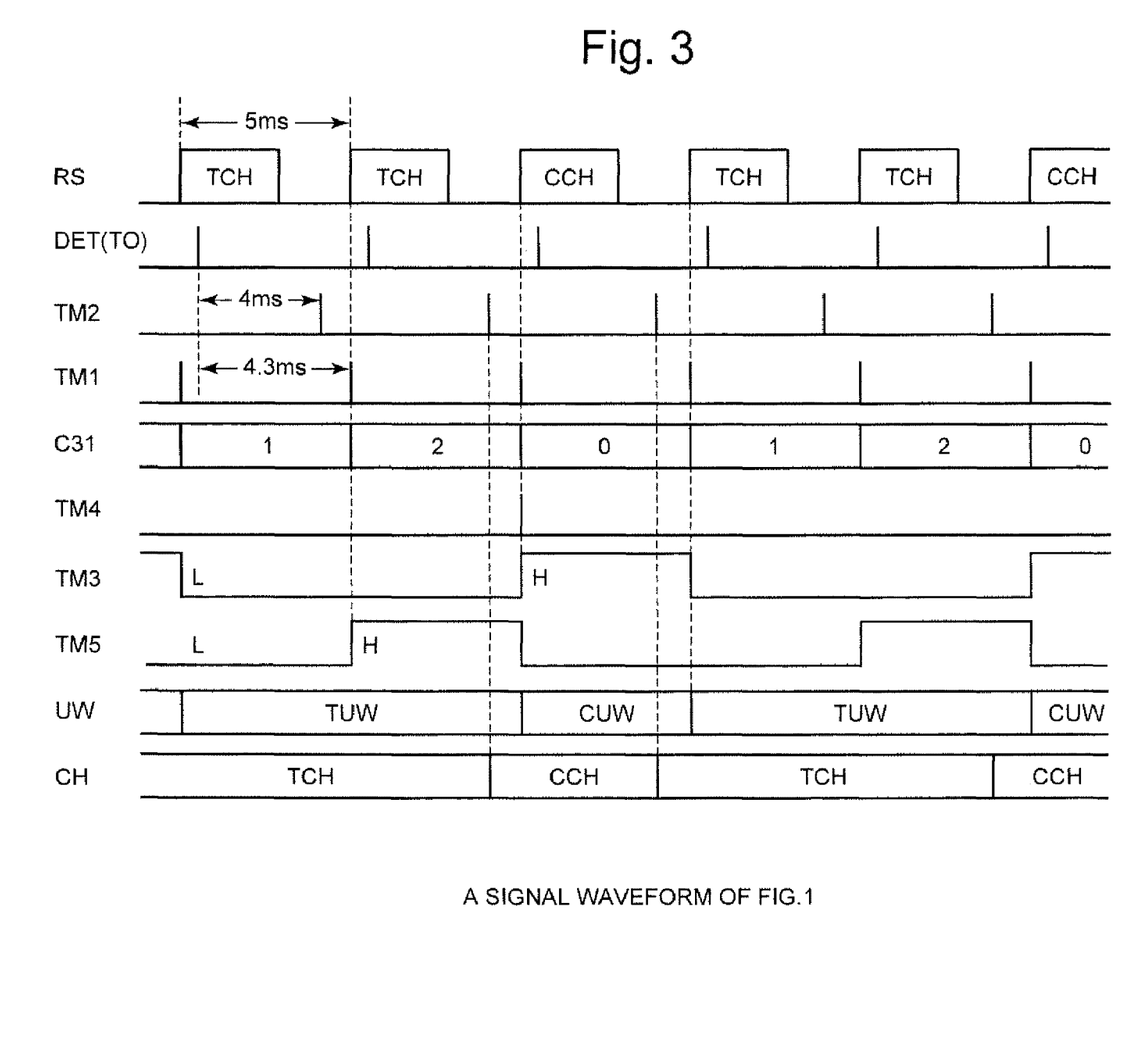
FIG. 3: A signal waveform diagram showing the operation of FIG. 1.

FIG. 3 is a signal waveform diagram showing the operation of FIG. 1. The operation of FIG. 1 will be explained referring to the above FIG. 3, as below.

On applying power to the mobile station, each of the registers is initially set. For explanation, N is assumed to be three. Furthermore, in the receiving apparatus, the LCCH designating signal CSL is set to be level H in order to receive the LCCH from the base station. By the above operation, both of the UW selecting signal S15 and the channel selecting signal S44 become level H, and then the unique word CUW for the LCCH set in the register 12 is selected in the selector 14 of the UW detection unit 10.

In addition, in the selector 43 of the PLL control unit 40, the channel setting signal CCH for the LCCH set in the register 41 is selected. Furthermore, the output signal from the selector 43 is held by the latch 45 according to the timing signal TM2 outputted from the frame-timing unit 20 in a period of 5 ms, and is given to the PLL 2 as the channel setting signal CH. By the above operation, an annunciation signal of the LCCH is outputted from the frequency unit 1 as a receiving signal RS, and is modulated by the modulating unit 3 as the receiving data RD.

The receiving data RD is given to the UW detecting unit 10 with the receiving clock RC, and is sequentially shifted and held in the shift register 11. The received data RD held and converted to a parallel data by the shift register 11 are given to the matching detection circuit 16 and compared with the unique word CUW for the LCCH selected by the selector 14. Subsequently, when the data pattern of the receiving data RD held in the shift register 11 matches to the data pattern of the unique word CUW, the UW detecting signal DET outputted from the matching detection circuit 16 becomes level H. When the receiving data RD is shifted by one bit by the subsequent clock, the UW detecting signal DET turns back to level L.

When the UW detecting signal becomes to level H, the counter 21 of the frame timing unit 20 is reset, and the counting value C21 of the counter 21 becomes zero. Subsequently, the UW detecting signal DET is turned back to level L, and then the counter 21 starts counting according to the clock signal CLK. The counting value C21 of the counter 21 is checked by the detecting circuits 22 to 24. When the counting value C21 becomes a value corresponding to 5 ms, the detecting circuit 24 changes a timeout signal TO to be level H. By the above operation, in the case where the UW detecting signal DET is provided, the counter 21 is reset at the above timing of being provided, and even in the case where the UW detecting signal DET is not provided, the counter 21 never fails to be reset at every 5 ms.

Meanwhile, the detecting circuit 22 outputs the timing signal TM 1 to the LCCH timing unit 30, when the counting value C21 becomes to indicate a timing just before the next frame is received (for example, a value corresponding to 4.3 ms). In addition, the detecting circuit 23 outputs the timing signal TM 2 to the LCCH timing unit 30, when the counting value becomes to indicate timing when the channel setting signal CH for the PLL 2 is provided to receive next frame (for example, a value corresponding to 4.3 ms).

The LCCH timing unit 30 counts up the counting value C31 of the counter 31 by one every time the timing signal TM 1 is provided. When the counting value C31 reaches to N (3 in the present embodiment), the timing signal TM4 from the comparing circuit 33 becomes to level H. By the above operation, the counter 31 is reset through the OR 38, and the counting value C31 immediately returns back to zero. Therefore, the counter 31 does counting up operation from zero to N−1 repeatedly, synchronized with the timing signal TM 1.

Meanwhile, zero detecting circuit 32 outputs the timing signal TM3 after changing the signal thereof to level H when the counting value C31 is zero. As the result of turning the timing signal TM 3 to level H, the UW selecting signal S 15 from the OR 15 of the UW detecting unit 10 becomes level H, and the above UW detecting unit 10 does detecting operation of the UW using the unique word CUW for the LCCH. Furthermore, when the UW detecting signal is outputted from the UW detecting unit 10 while the timing signal TM3 is level H, the output signal of the AND 37 becomes level H, and the counter 31 is reset through the OR 38.

AT the same time, the detecting circuit 34 changes a timing signal TMS to be level H and outputs the above changed signal when the counting value C31 becomes N−1 (: 2 in the present embodiment). As a result of changing the timing signal TM5 to be level H, the channel-selecting signal S44 from the OR 44 of the PLL control unit 40 becomes level H and the channel setting signal CCH for the LCCH set in the register 41 is selected by the selector 43. Subsequently, the output signal from the selector 43 is held in the latch 45 by the timing signal TM2 from the frame-timing unit 20, and is given to the PLL 2 as a channel setting signal CH. By the above operation, the annunciation signal of the LCCH is selected by the frequency-transforming unit 1 and is outputted as the receiving signal RS, and then the receiving data RD is outputted from the demodulating unit 3.

The communication process control unit does setting-up process of a link-channel and a service-channel to the base station. Furthermore, the communication process control unit sets the channel setting signal TCH corresponding to the above set-up service channel in the register 42 of the PLL control unit 40.

The counter 31 of the LCCH timing unit 30 counts up according to the timing signal TM1 from the detecting circuit 23 of the frame-timing unit 20. Subsequently, when the counting value C31 of the counter 31 reaches to the LCCH period, the timing signal TM4 is outputted from the comparing circuit 33 and the counter 31 is reset.

When the counting vale C31 of the counter 31 is zero, that is, when the timing signal TM3 indicating the receiving period of the LCCH is level H, the unique word CUW for the LCCH is selected in the UW detecting unit 10. Meanwhile, in other timings, the unique word TUW for the service channel is selected.

In addition, when the counting value C31 of the counter 31 is 2, that is, when the timing signal TMS indicating the value one less than the LCCH period is level H, the channel setting signal CCH for the LCCH is selected in the PLL control unit 40. Meanwhile, in other timings, the channel setting signal TCH for the service channel is selected.

As explained before, the receiving apparatus according to the first embodiment of the invention detects the timing of the LCCH by counting a timing signal TM1 outputted at every frame of 5 ms from the frame-counting unit 20, and includes the UW detecting unit 10 and the PLL setting unit 40 for switching automatically the UW expected value and the receiving frequency by the above detected timing signals TM3, TM4. By the above configuration, there is an advantage that the LCCH steal receiving can be done without overload on the control processor.

Second Embodiment

Figure 4:
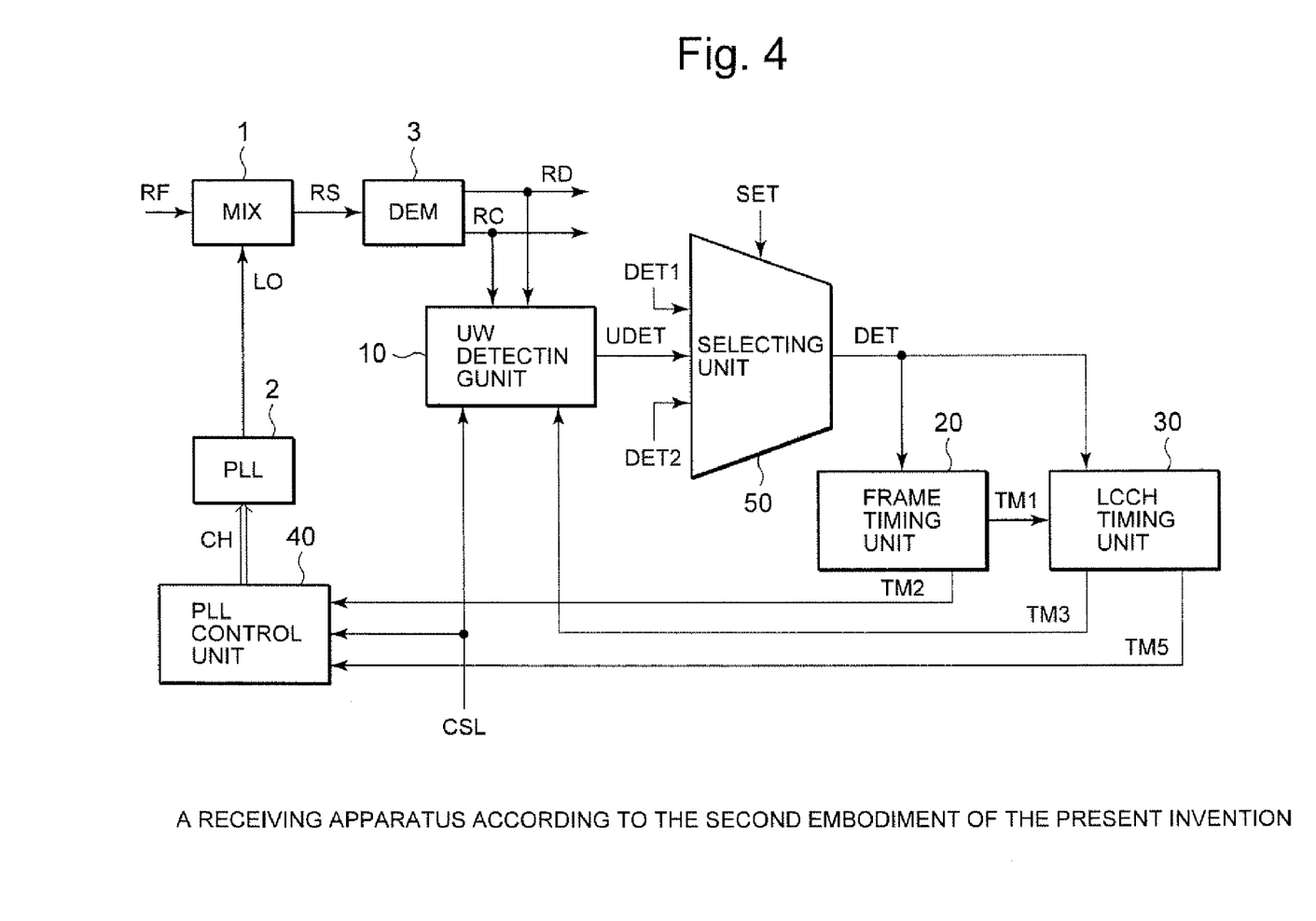
FIG. 4: A general configuration diagram of a receiving apparatus according to the second embodiment of the present invention.

FIG. 4 is a general configuration diagram of a receiving apparatus according to the second embodiment of the present invention, and elements identical to ones in FIG. 1 are given the same numerals as in FIG. 1. The above receiving apparatus is a receiving unit of a mobile station of PHS, as well as in FIG. 1, and includes a selecting unit (selector) 50 for selecting a synchronous timing added to the receiving apparatus of FIG. 1.

The selecting unit 50 selects one signal out of a UW detecting signal UDET from the UW detecting unit 10, or detecting signals DET 1, DET 2 outputted periodically from other period information detecting units not shown in the drawings, accordingly to a selecting signal SEL given from a communication process control unit not shown in the drawings, and provides the frame-timing unit 20 and the LCCH timing unit 30 with the above selected signal as a detecting signal DET.

As the above mentioned other period information detecting units, there are, for example, a CSID (Cell Station Identification) matching detection unit for generating a CSID matching signal by detecting CSID data annunciated by a receiving data RD, and a CRC (Cyclic Redundancy Check) detecting unit for outputting checking results of the received CRC, and so on. The detecting signals DET 1, DET 2 from the above CSID detecting unit and the CRC detecting unit are signals outputted periodically only once in one frame. Other configurations are the same as in FIG. 1.

According to the above receiving apparatus of the second embodiment, the operations of the frame-timing unit 20 and the LCCH timing unit 30 are the same and have the same advantages as in the first embodiment except that the above operations are done according to timings of the UW detecting signal UDET or other detecting signals DET 1, DET 2 by the selecting signal SEL given from the communication process control unit.

Furthermore, since the above receiving apparatus according to the second embodiment can switch the detecting signal DET according to the selecting signal SEL by including the selecting unit 50, for example, in the case where the UW detecting signal UDET becomes unable to be detected, there is an advantage that the communication can be continued using the CSID matching signal or the CRC detecting signal.

Third Embodiment

Figure 5:
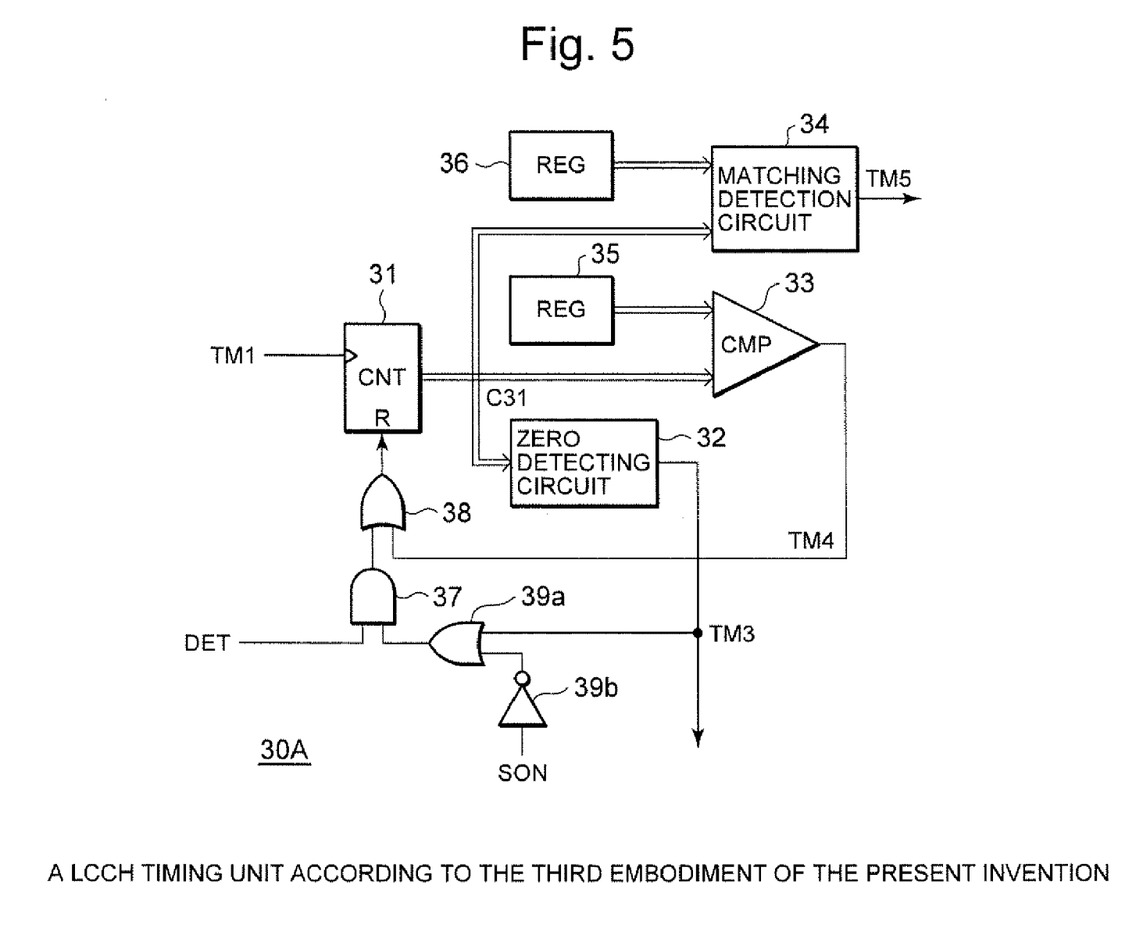
FIG. 5: A configuration diagram of a LCCH timing unit according to the third embodiment of the present invention.

FIG. 5 is a configuration diagram of a LCCH timing unit according to the third embodiment of the present invention. The above LCCH timing unit 30A is included instead of the LCCH timing unit 30 in FIG. 1 or FIG. 4, and the elements identical to ones in FIG. 1 are given the same numerals as in FIG. 1.

In the above LCCH timing unit 30A, there is a configuration that the LCCH steal communication can be set to do or not to do by a communication process control unit not shown in the drawings, as needed, and a two-input OR 39a and an inverter 39b are inserted between the output side of the zero detecting circuit 32 and the AND 37. In addition, the timing signal TM3 is given to one of the input sides of the OR 39a, and a still-on signal SON from the communication process control unit are inverted by the inverter 39b and provides the other input side of the OR 39a with the above inverted signal. Other configurations are the same as in FIG. 1.

In the above LCCH timing unit 30A, since the output signal of the inverter 39b becomes level L when the still-on signal SON is level H, the exact same operation is done as in the LCCH timing unit 30 of FIG. 1.

Meanwhile, when the still-on signal SON is level L, the output signal from the OR 39a becomes level H, independently from the timing signal TM3 from the zero detecting circuit 32.

By the above operation, every time the UW detecting signal DET is outputted from the UW detecting unit 10, the counter 31 is reset. Consequently, the LCCH is always being received and the LCCH steal receiving is not done.

As explained before, since the LCCH timing unit 30A according to the above third embodiment is configured to reset the counter 31 always synchronized with the timing of the LCCH timing when the still-on signal SON is level L (off), there is an advantage that the LCCH timing unit 3 can never fails to synchronize with the LCCH before the packet data communication using the service channel is started.

Additionally, the present invention is not limited to the above embodiments, and various modifications are possible. The examples of the above modifications are as follows.

(a) The receiver of PHS mobile station is explained as an example, however, the present invention is not limited to PHS, and is applicable to a radio receiving apparatus of TDMA method for receiving intermittently service channels.

(b) A configuration to switch the UW and channel setting signals for communication and control is adapted, however, a configuration to switch other control signals can be adapted, as needed.

(c) The timings of the timing signals TM1, TM2 from the detecting circuits 22, 23 are only examples, and the optimum condition needs to be set corresponding to the adapted TD method.

(d) Two registers 35, 36 are included to set the values of N, N−1 for the LCCH timing units 30, 30A, however, in the case where the comparator 33 is configured to output the timing signal TM4 when the counting value C31 becomes more than the set value of the register 36, the register 35 is not necessary.

(e) The detecting signals being switched by the selecting unit 50 in FIG. 4 are not limited to the detecting signals of the UW detecting unit 10, the CSID matching detection unit, and the CRC detecting unit. The above detecting signals can be information detecting signals outputted when a predetermined information is detected out of information periodically received once in one frame as the receiving data RD.

What is claimed is:

1. A receiving apparatus of mobile station for conducting radio communication of Time Division Multiple Access method using control channels and service channels between base stations being characterized by comprising;

a modulating unit for outputting a receiving data after receiving and demodulating a signal sent from a base station according a channel setting signal;

a unique word detecting unit for switching synchronous patterns for control and communication according to a first selecting signal and outputting a detecting signal when the same pattern as the switched synchronous pattern appears in the receiving data;

a frame timing unit for outputting a first timing signal and a second timing signal periodically at a specific frame period, synchronized with the detecting signal;

a control channel timing unit including a counter for counting the first timing signal, a zero detecting circuit for outputting the first selecting signal according to whether or not a counting value of the counter is zero, a comparing circuit for resetting the counter to zero when the counting value becomes more than a value set in a register, and a matching detection circuit for outputting a second selecting signal when the counting value matches to the value set in the register;

a selector for selecting the channel for control or the channel for communication based on the second selecting signal;

and a channel control unit for holding a channel selected by the selector according to the second timing signal and giving the held channel to the demodulating unit as the channel setting signal.

2. The receiving apparatus according to claim 1, wherein the control channel timing unit is configured to reset the counter to zero every time the detecting signal is outputted from the unique word detecting unit while a signal for receiving forcibly the control channel is being provided.

3. A receiving apparatus of mobile station for conducting radio communication of Time Division Multiple Access method using control channels and service channels between base stations being characterized by comprising;
- a modulating unit for outputting a receiving data after receiving and demodulating a signal sent from a base station according a channel setting signal;
- a unique word detecting unit for switching synchronous patters for control and communication according to a first selecting signal and outputting a detecting signal when the same pattern as the switched synchronous pattern appears in the receiving data;
- a period information detecting unit for outputting an information detecting signal when a given information being received periodically is detected in the receiving data;
- a selecting unit for selecting the unique word detecting signal or the information detecting signal based on a selecting signal and outputting the selected signal as a detecting signal;
- a frame timing unit for outputting a first timing signal and a second timing signal periodically at a specific frame-period, synchronized with the detecting signal;
- a control channel timing unit including a counter for counting the first timing signal, a zero detecting circuit for outputting the first selecting signal according to whether or not a counting value of the counter is zero, a comparing circuit for resetting the counter to zero when the counting value becomes more than a value set in a register, and a matching detection circuit for outputting a second selecting signal when the counting value matches to the value set in the register;
- a selector for selecting the channel for control or the channel for communication based on the second selecting signal; and
- a channel control unit for holding a channel selected by the selector according to the second timing signal and giving the held channel to the demodulating unit as the channel setting signal.

4. The receiving apparatus according to claim 3, wherein the control channel timing unit is configured to reset the counter to zero every time the detecting signal is outputted from the selecting unit while a signal for receiving forcibly the control channel is being provided.

* * * * *